US006938911B1

(12) United States Patent
Shyu et al.

(10) Patent No.: US 6,938,911 B1
(45) Date of Patent: Sep. 6, 2005

(54) FOLDING WHEELCHAIR

(75) Inventors: Jeng-Huey Shyu, Hsintien (TW); Chun-Tao Lee, Chungho (TW)

(73) Assignee: Hanlong Industrial Co., Ltd., Taipei (TW)

( * ) Notice: Subject to any disclaimer, the term of this patent is extended or adjusted under 35 U.S.C. 154(b) by 0 days.

(21) Appl. No.: 10/865,788

(22) Filed: Jun. 14, 2004

(51) Int. Cl.[7] .................................... B62M 1/14
(52) U.S. Cl. .................................... 280/250.1; 280/650
(58) Field of Search .................................... 280/250.1, 649, 280/304.1, 644, 39, 650, 42, 47.38, 47.41

(56) References Cited

U.S. PATENT DOCUMENTS

| | | | | |
|---|---|---|---|---|
| 6,131,940 | A * | 10/2000 | Arnoth | 280/650 |
| 6,227,559 | B1 * | 5/2001 | Slagerman et al. | 280/650 |
| 6,302,429 | B1 * | 10/2001 | Friedrich | 280/649 |
| 6,343,805 | B1 * | 2/2002 | Roy | 280/250.1 |
| 6,352,275 | B1 * | 3/2002 | Lindenkamp | 280/250.1 |
| 6,769,503 | B2 * | 8/2004 | Cheng | 180/68.5 |
| 6,776,433 | B2 * | 8/2004 | Harrison et al. | 280/647 |
| 2002/0038943 | A1 * | 4/2002 | Kuroda | 280/250.1 |

FOREIGN PATENT DOCUMENTS

| | | | | |
|---|---|---|---|---|
| DE | 3136099 | * | 4/1983 | A61G 5/02 |
| GB | 2125740 | * | 3/1984 | B62B 3/02 |

* cited by examiner

*Primary Examiner*—Avraham Lerner
(74) *Attorney, Agent, or Firm*—Rosenberg, Klein & Lee

(57) ABSTRACT

A folding wheelchair includes two side frame units arranged in parallel at two sides, each side frame unit formed of two four-bar linkages arranged at different elevations, a plurality of folding bars transversely coupled between the side frame units, two sets of guide rods respectively coupled to the side frame units and adapted to guide folding of the wheelchair between the extended position and the collapsed position, and two swivel hooks for hooking on the pivot between each set of guide rods to lock the wheelchair in the extended position.

5 Claims, 10 Drawing Sheets

FOLDING WHEELCHAIR

BACKGROUND OF THE INVENTION

1. Field of the Invention

The present invention relates to a wheelchair and more particularly, to a folding wheelchair.

2. Description of the Related Art

A conventional folding wheelchair commonly uses a single scissors mechanism to achieve the desired folding action. A folding wheelchair of this design still occupies much storage space when collapsed because the two opposite side frame units are not foldable. There are known folding wheelchairs that can be received in a carrying box when collapsed. However, these folding wheelchairs commonly have a complicated structure. It is complicated to extend out or collapse these folding wheelchairs.

Therefore, it is desirable to provide a folding wheelchair that eliminates the aforesaid drawbacks.

SUMMARY OF THE INVENTION

The present invention has been accomplished under the circumstances in view. It is one object of the present invention to provide a folding wheelchair, which requires less storage space when collapsed. It is another object of the present invention to provide a folding wheelchair, which has a light weight and, is easy to use. To achieve these and other objects of the present invention, the folding wheelchair comprises two side frame units arranged in parallel at two sides, each side frame unit formed of two four-bar linkages arranged at different elevations, a plurality of folding bars transversely coupled between the side frame units, two sets of guide rods respectively coupled to the side frame units and adapted to guide folding of the wheelchair between the extended position and the collapsed position, and two swivel hooks for hooking on the pivot between each set of guide rods to lock the wheelchair in the extended position.

BRIEF DESCRIPTION OF THE DRAWINGS

FIG. 3–1 is a schematic side view of the present invention showing the folding wheelchair pushed forwards/backwards after locked in the operative position.

FIG. 3–2 is a schematic drawing of the present invention showing the folding wheelchair received a downward pressure after locked in the operative position.

DETAILED DESCRIPTION OF THE PREFERRED EMBODIMENT

Figure 1:
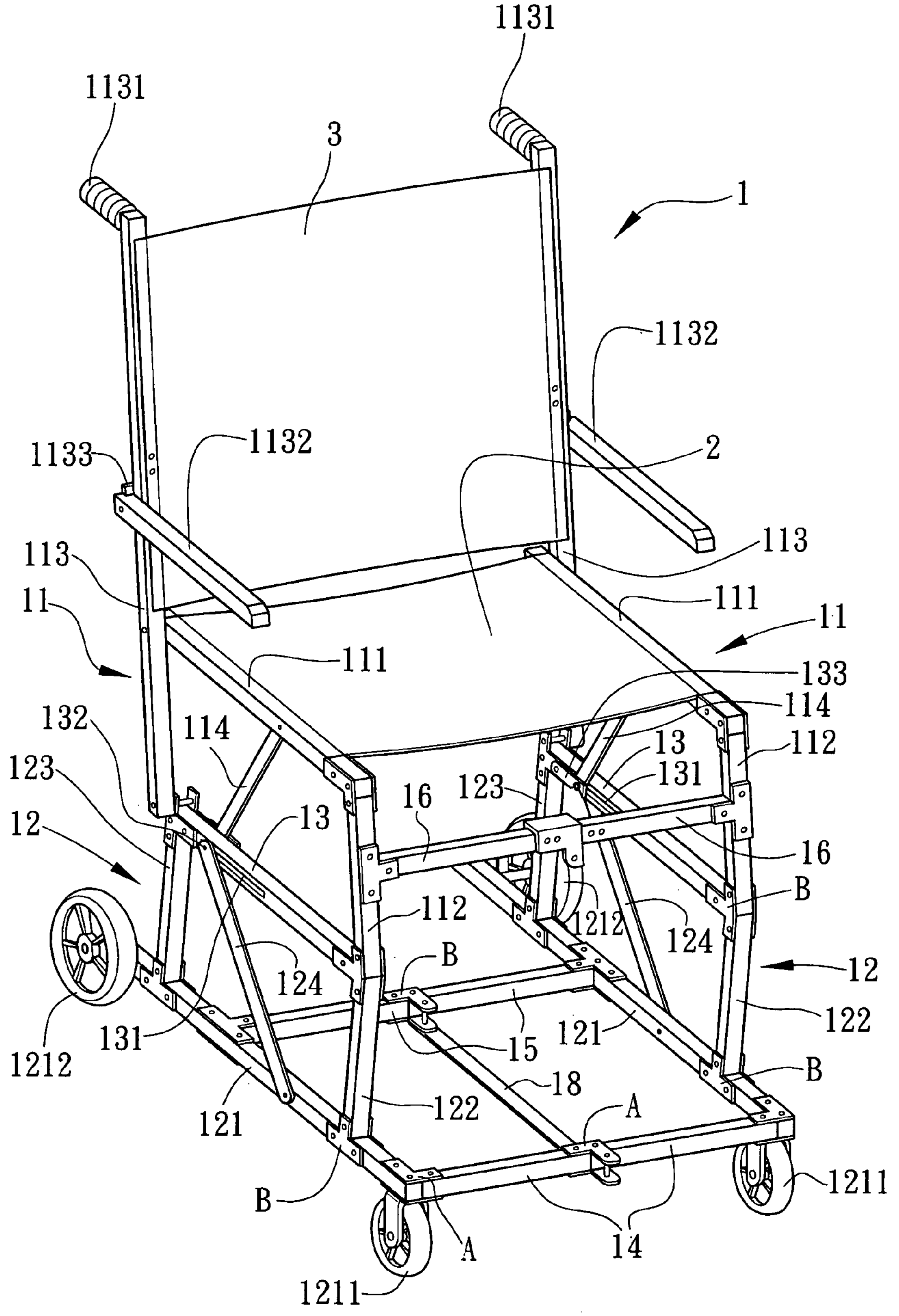
FIG. 1 is an oblique front elevation of a folding wheelchair according to the present invention.
Figure 2:
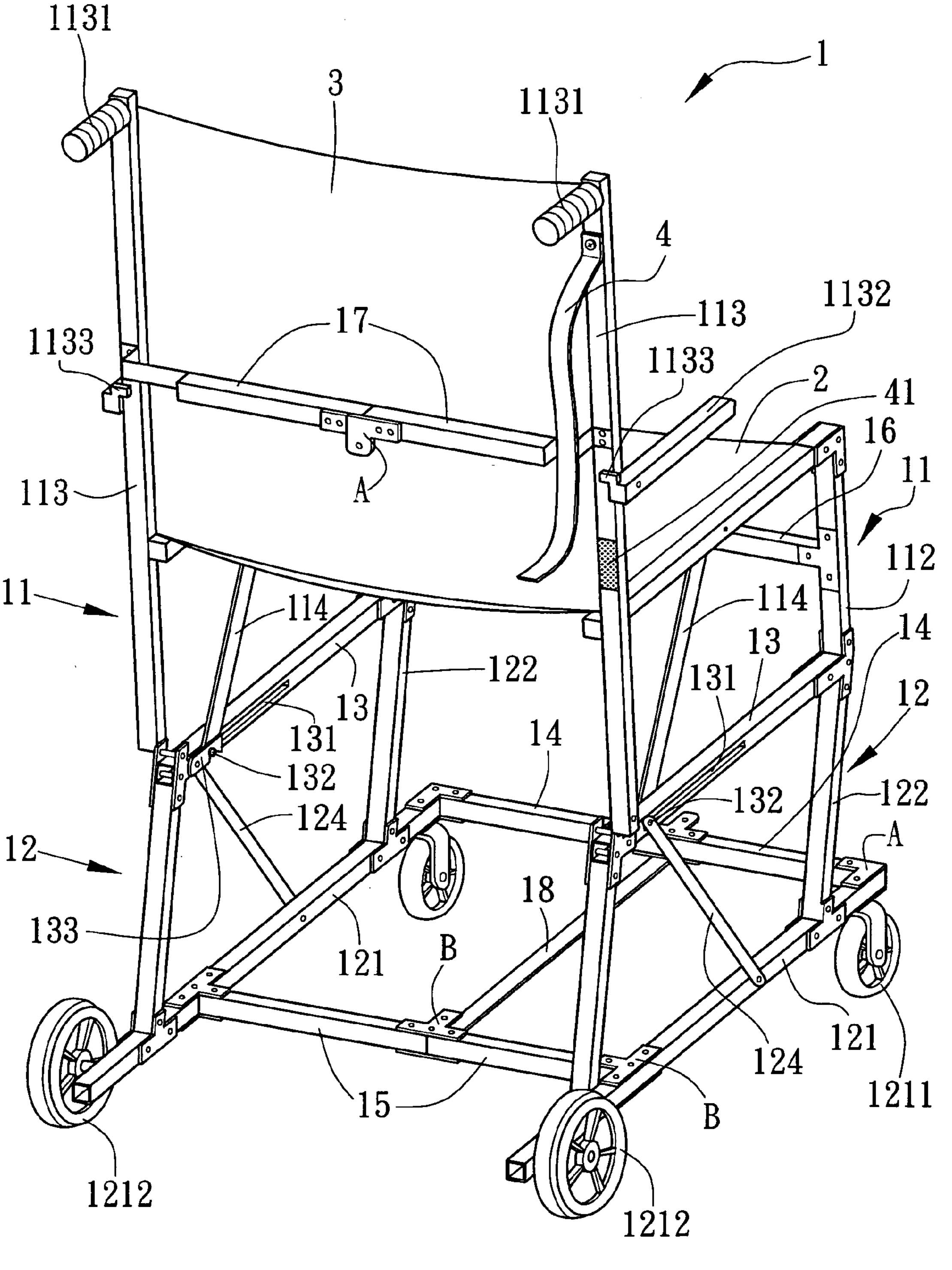
FIG. 2 is an oblique rear elevation of the folding wheelchair according to the present invention.
Figure 3:
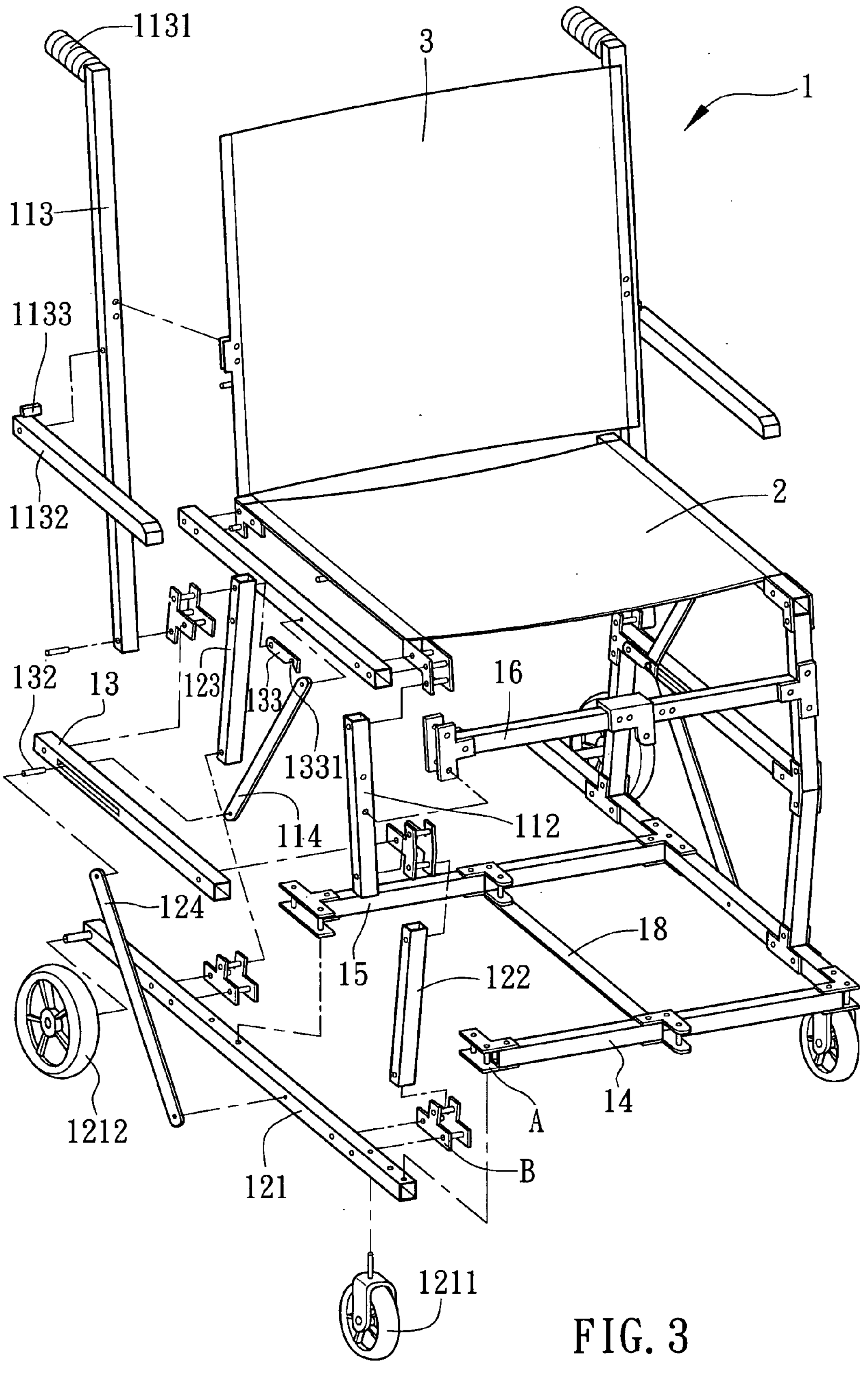
FIG. 3 is an exploded view of the folding wheelchair according to the present invention.
Figures 1, 3:
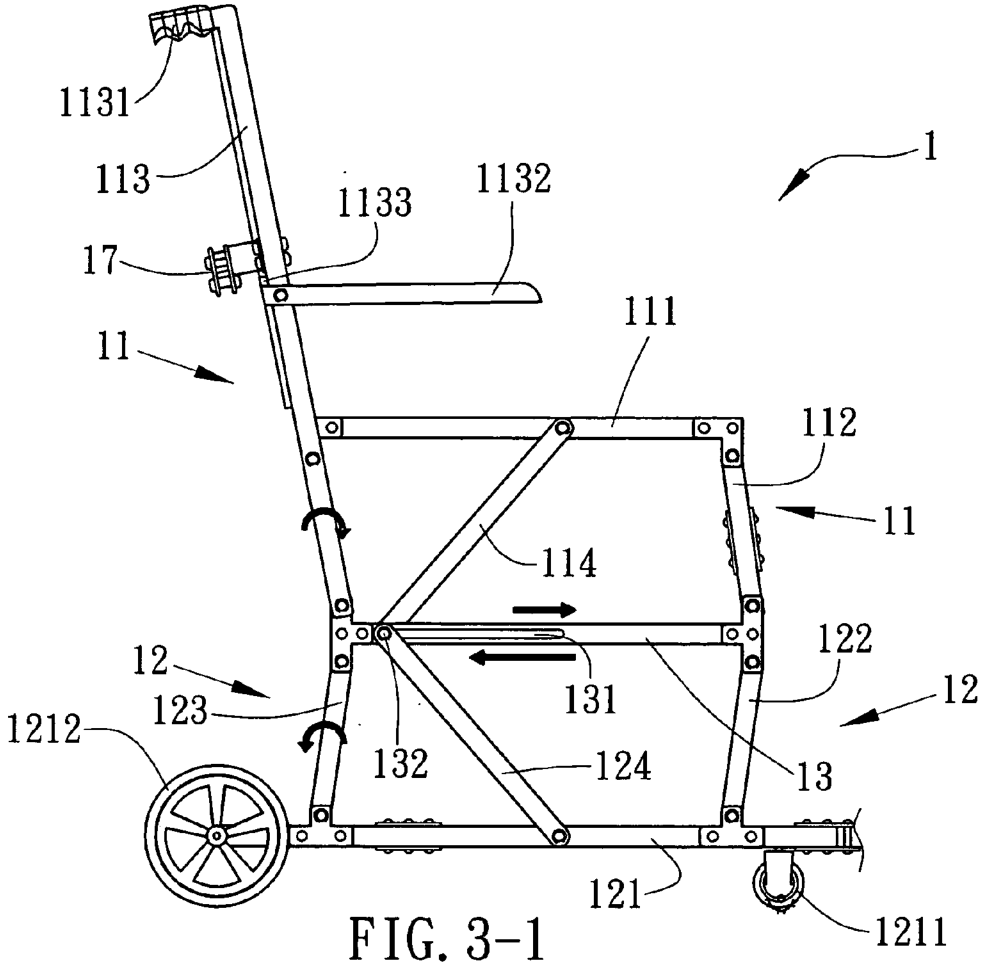
Figures 2, 3:
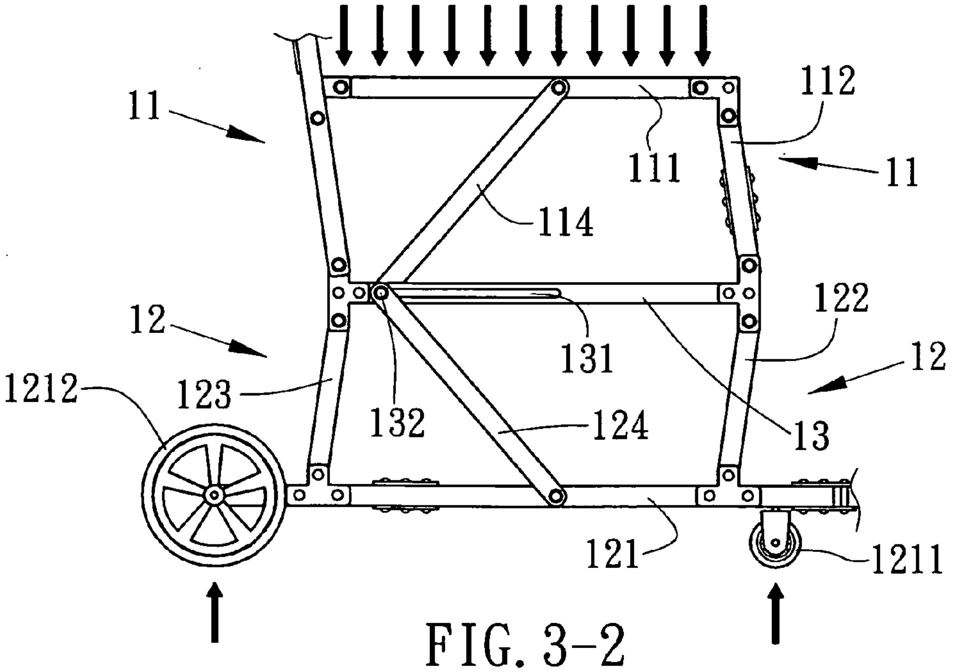
Figure 4:
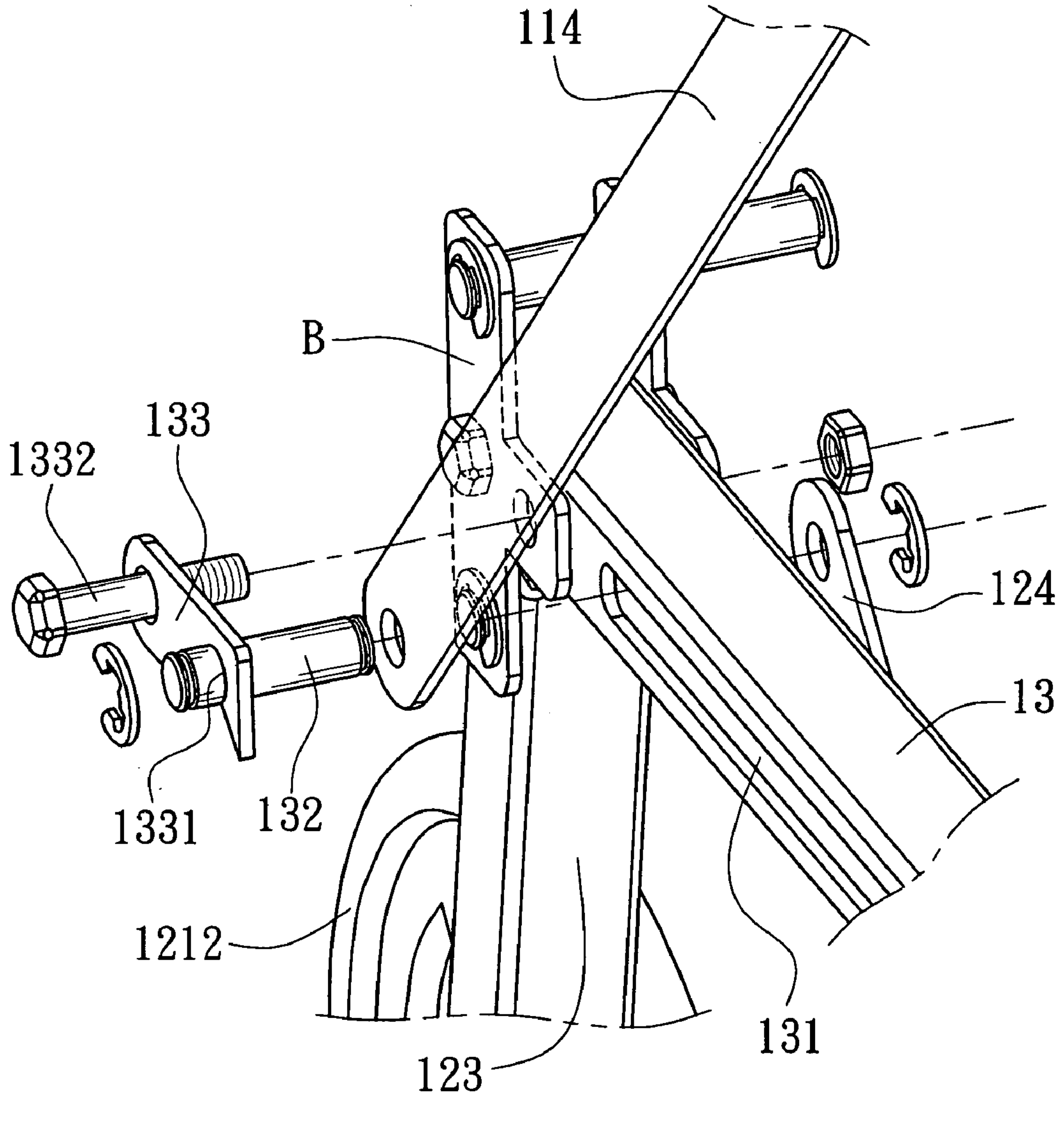
FIG. 4 is an exploded view in an enlarged scale of a part of the present invention, showing the connection structure between the first guide rod and the second guide rod.

Referring to FIGS. 1~4, a folding wheelchair 1 is shown comprising two opposite side frame units (see the reference signs 11 and 12 at each of the two opposite sides of the folding wheelchair 1) each formed of a first four-bar linkage 11 and a second four-bar linkage 12. The first four-bar linkage 11 and the second four-bar linkage 12 are arranged at different elevations. The first four-bar linkage 11 is comprised of a first horizontal bar 111, a second horizontal bar 13, a first vertical bar 112, and a second vertical bar 113. The second four-bar linkage 12 is comprised of a first horizontal bar 121, a second horizontal bar 13, a first vertical bar 122, and a second vertical bar 123. The first four-bar linkage 11 and the second four-bar linkage 12 use a common second horizontal bar 13. The common second horizontal bar 13 has a longitudinal sliding slot 131. A first guide rod 114 and a second guide rod 124 are respectively coupled to the first four-bar linkage 11 and the second four-bar linkage 12. The first guide rod 114 and the second guide rod 124 each have a first end pivoted to the first horizontal bar 111 or 121 of the respective four-bar linkage 11 or 12 and a second end pivoted to each other by a pivot pin 132 that inserts through the longitudinal sliding slot 131 of the common second horizontal bar 13 to guide movement of the second ends of the guide rods 114, 124 along the longitudinal sliding slot 131 of the common second horizontal bar 13. The second vertical bar 113 of the first four-bar linkage 11 extends upwards over the top side of the first horizontal bar 111 to a distance for the mounting of a fabric back panel 3. The second vertical bar 113 has the top end fixedly provided with a grip 1131, and a middle part fixedly provided with an armrest 1132 above the first horizontal bar 111. The armrest 1132 has a stop block 1133 at the rear end that enables the armrest 1132 to be set in a particular position when extended out. A first folding bar 14 and a second folding bar 15 are respectively pivotally connected between the front and rear ends of the first horizontal bars 121 of the second four-bar linkages 12 of the two side frame units of the folding wheelchair 1. A third folding bar 16 is connected between a middle part of the first vertical bar 122 of the second four-bar linkage 12 of each of the two side frame units of the folding wheelchair 1. A fourth folding bar 17 is connected between the second vertical bar 113 of the first four-bar linkage 11 of each of the two side frame units of the folding wheelchair 1. A stretcher 18 is connected between the first folding bar 14 and the second folding bar 15. By means of folding up the folding bars 14~17, the two side frame units, i.e., the two sets of four-bar linkages 11,12 are received to each other. Further, the rod members of the folding wheelchair 1 are respectively connected to one another by a respective pair of L-shaped connecting plates A or T-shaped connecting plates B. The L-shaped connecting plates A are adapted to connect one end of a first rod member to one end of a second rod member. The T-shaped connecting plates B are adapted to connect one end of a first rod member to a middle part of a second rod member.

Figure 5:
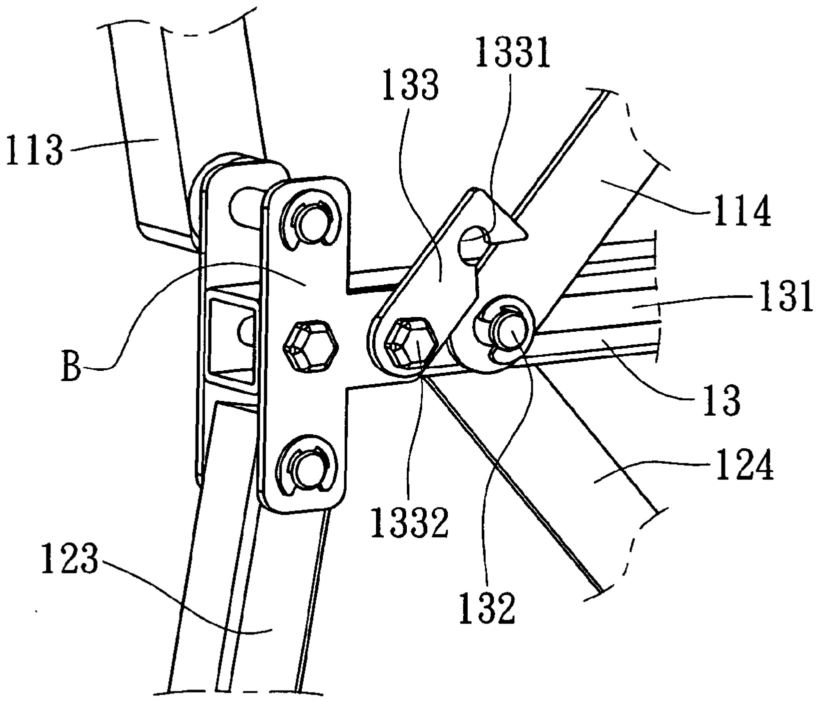
FIG. 5 is a perspective view in an enlarged scale of a part of the present invention showing the swivel hook disengaged from the respective pivot pin.
Figure 6:
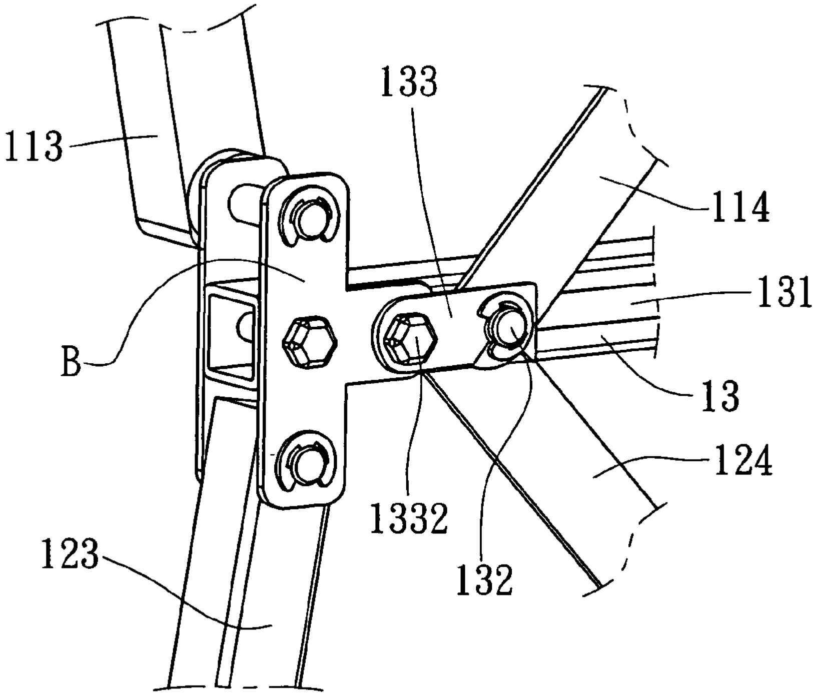
FIG. 6 is similar to FIG. 5 but showing the swivel hook hooked on the respective pivot pin.
Figure 7:
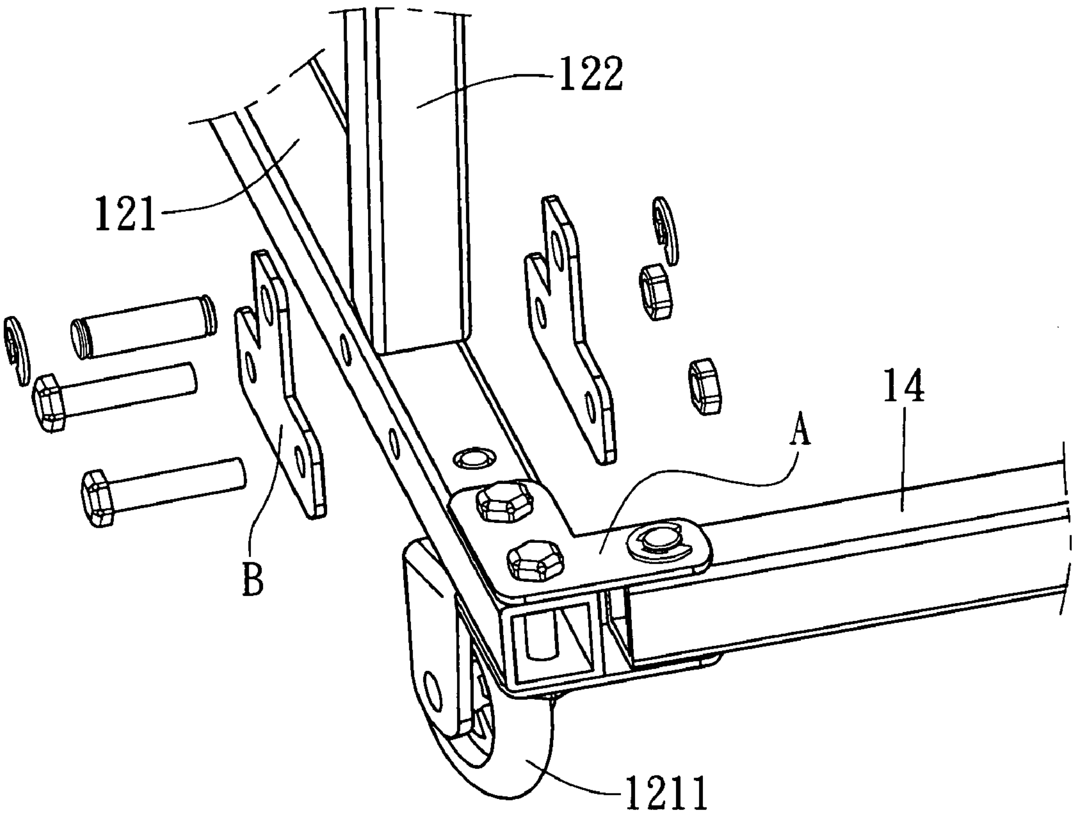
FIG. 7 is an exploded view in an enlarged scale of a part of the present invention, showing the connection arrangement between the first horizontal bar and the first folding bar and the connection arrangement between the first horizontal bar and the first vertical bar.

A swivel hook 133 is pivotally connected to the T-shaped connecting plates B between the second vertical bars 113, 123 of the four-bar linkages 11, 12 of each side frame unit of the folding wheelchair 1 by a bolt 1332. The swivel hook 133 has a hooked portion 1331 at the free end for hooking on the pivot pin 132 that inserts through the longitudinal sliding slot 131 of the common second horizontal bar 13 to couple the second ends of the first guide rod 114 and the second guide rod 124 (see FIGS. 4~6). When the swivel hook 133 is hooked on the pivot pin 132, the guide rods 114,124 are locked, and therefore the folding wheelchair 1 is locked in the operative position, and can be pushed forwards or backwards in the operative position (see FIG. 3–1). After disengagement of the swivel hook 133 from the pivot pin 132, the user can then collapse the folding wheelchair 1. Further, the front and rear ends of the first horizontal bar 121 of the second four-bar linkage 12 are respectively mounted with a steering wheel 1211 and a directional wheel 1212.

Figure 8:
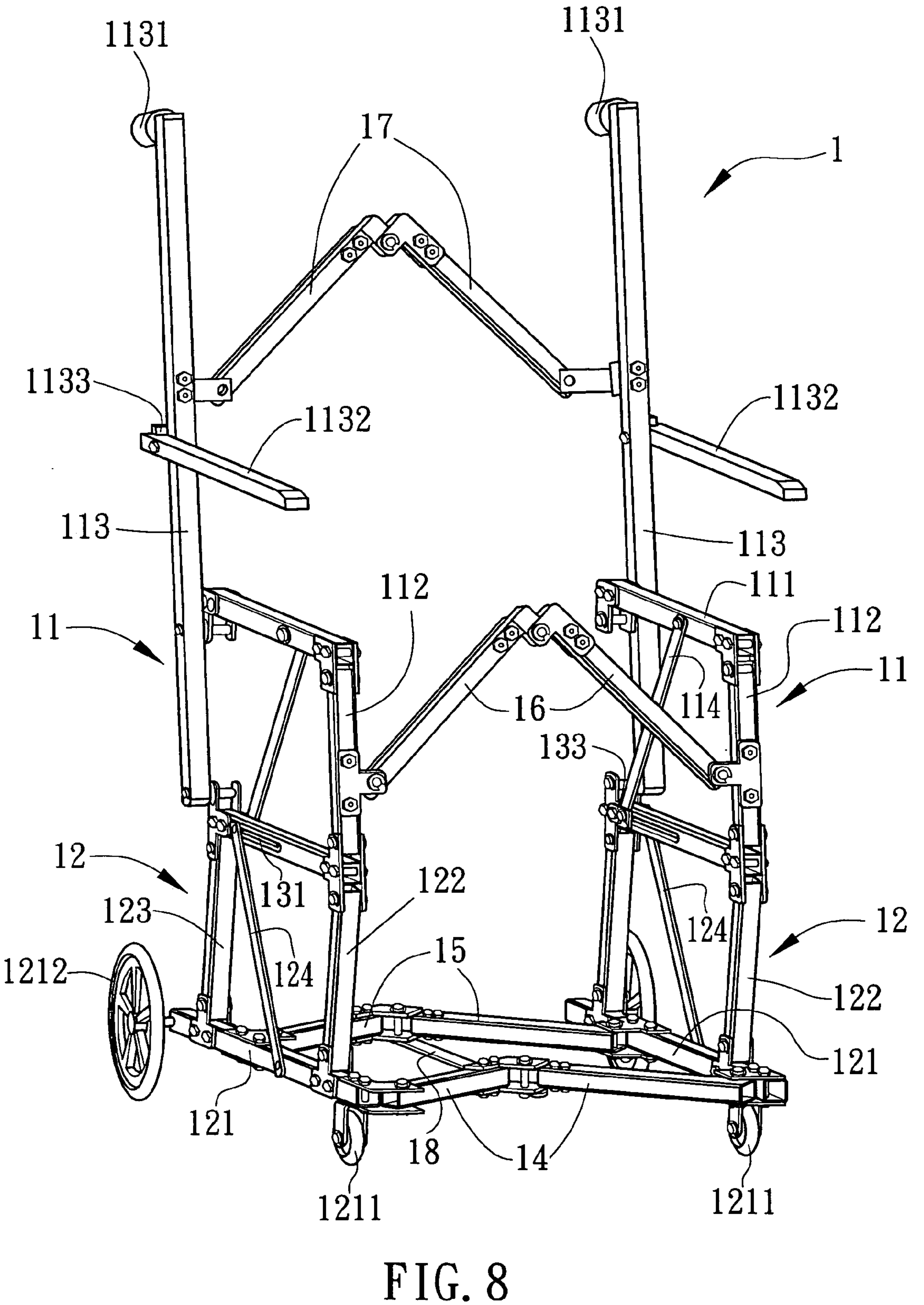
FIG. 8 is a schematic drawing showing the folding operation of the folding wheelchair according to the present invention (I).
Figure 9:
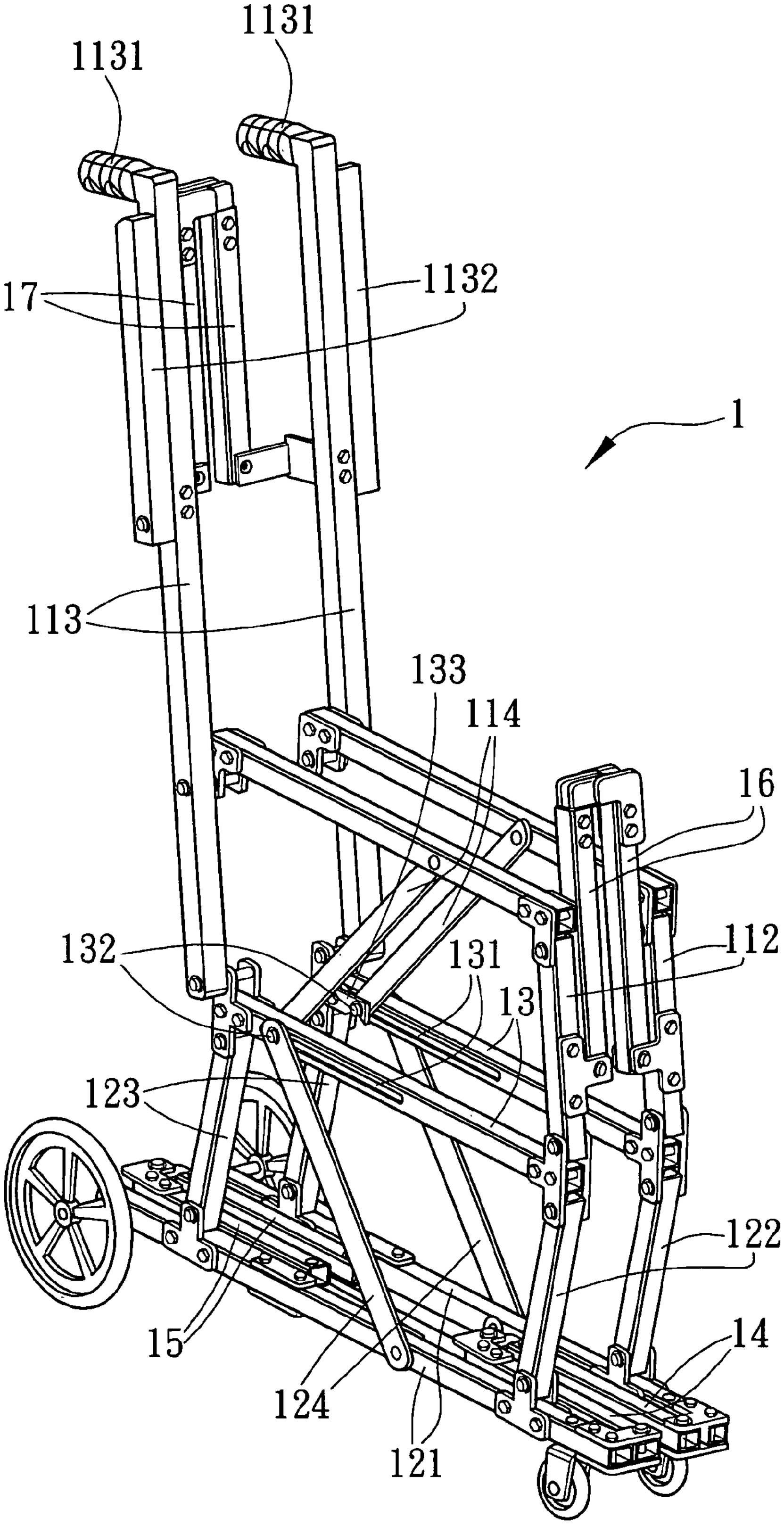
FIG. 9 is a schematic drawing showing the folding operation of the folding wheelchair according to the present invention (II).
Figure 10:
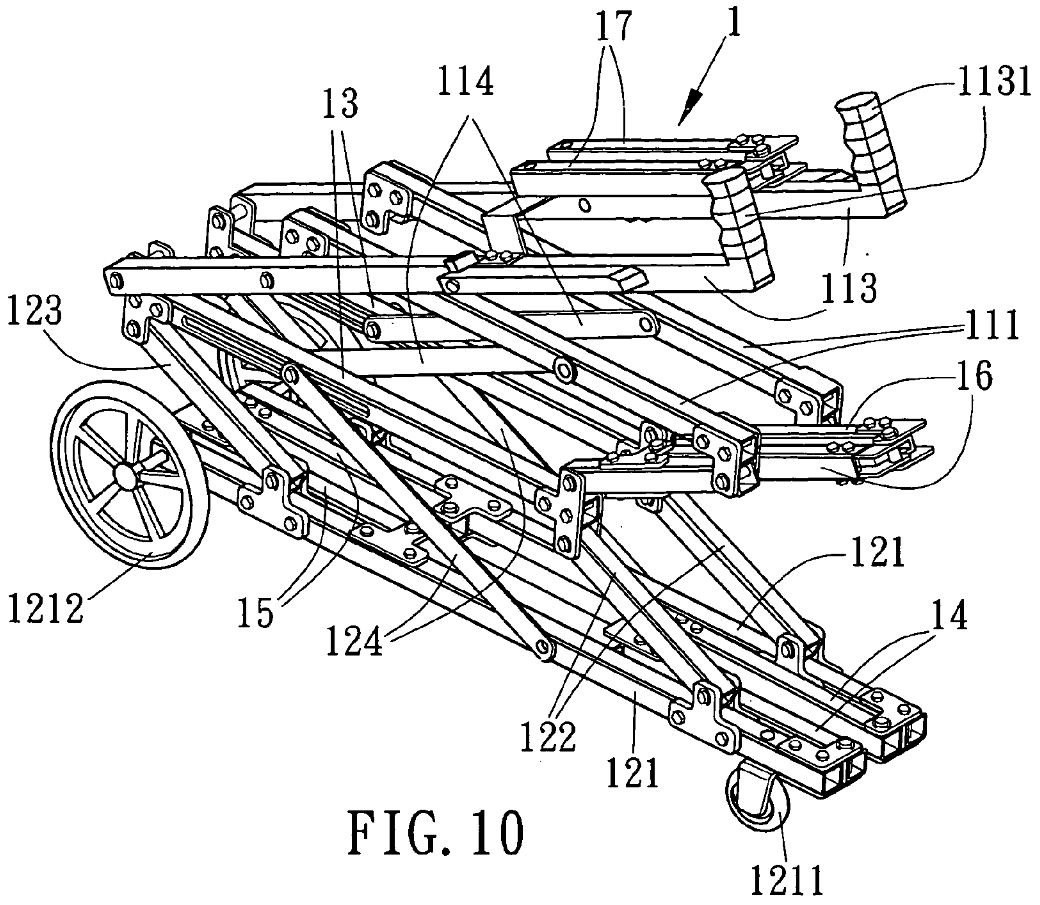
FIG. 10 is a schematic drawing showing the folding operation of the folding wheelchair according to the present invention (III).
Figure 11:
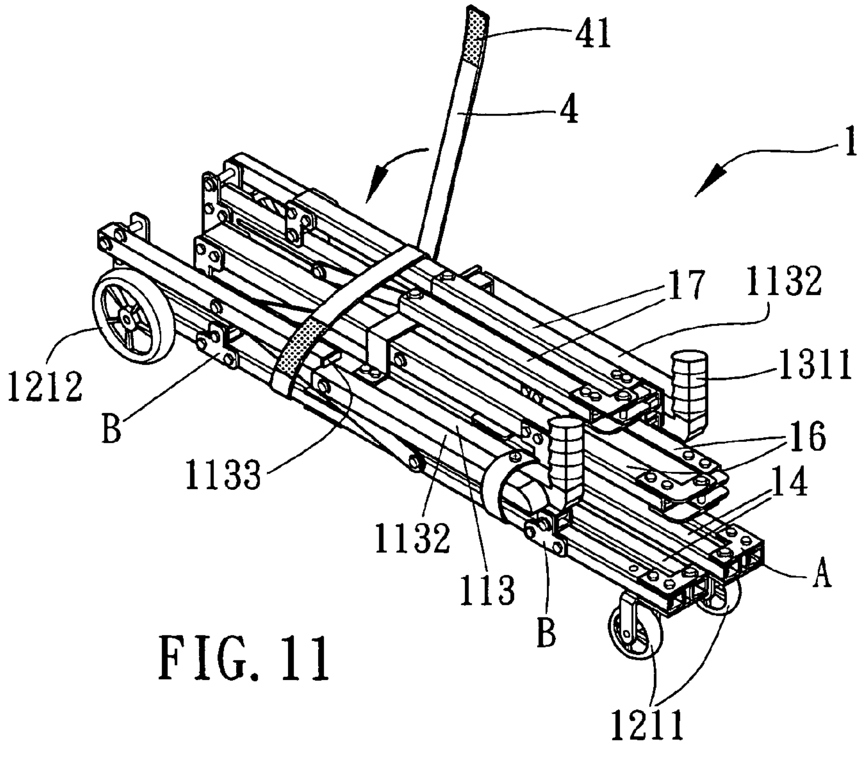
FIG. 11 illustrated the folding wheelchair collapsed and tied up.

Referring to FIGS. 8~10, when collapsing the folding wheelchair 1, the two swivel hooks 133 at the two side frame units are respectively disengaged from the respective pivot pins 132, and then the first folding bar 14 and second folding bar 15 are folded backwards and the third folding bar 16 and fourth folding bar 17 are folded upwards. When folding up the folding bars 14~17, the guide rods 114, 124 are moved with the pivot pin 132 along the longitudinal sliding slot 131 of the common second horizontal bar 13 at the same side of the folding wheelchair 1 to guide smooth movement of the two sets of four-bar linkages 11, 12 toward each other. Further, a binding strap 4 is provided at second vertical bar 113 of the first four-bar linkage 11 at one side of the folding wheelchair 1 for tying up the folding wheelchair 1 in the collapsed status by means of hook and loop materials 41 (see FIG. 11). Further, when the user sits on the fabric seat panel 2 between the first horizontal bars 111 of the two first four-bar linkages 11 at two sides of the folding wheelchair 1 to give a downward pressure to the four-bar linkages 11, 12 after the folding wheelchair 1 has been fully extended out (see FIG. 3-1), thereby holding down the engagement between each swivel hook 133 and the respective pivot pin 132.

A prototype of folding wheelchair has been constructed with the features of FIGS. 1~11. The folding wheelchair functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A folding wheelchair comprising:

two side frame units arranged in parallel at two sides, said side frame units each comprising a first four-bar linkage, a second four-bar linkage arranged at different elevations, a first guide rod, a second guide rod, and a pivot pin, said first four-bar linkage and said second four-bar linkage each comprised of a first horizontal bar, a second horizontal bar, a first vertical bar, and a second vertical bar, said first four-bar linkage and said second four-bar linkage having the same second horizontal bar, which has a longitudinal sliding slot, said first guide rod having a first end pivoted to the first horizontal bar of said first four-bar linkage and a second end, said second guide rod having a first end pivoted to the first horizontal bar of said second four-bar linkage and a second end, said pivot pin being inserted through the longitudinal sliding slot of the common second horizontal bar of said first four-bar linkage and said second four-bar linkage and pivotally connected between the second end of said first guide rod and the second end of said second guide rod, the second vertical bar of said first four-bar linkage extending upwards over a top side of the respective first horizontal bar;

a first folding bar and a second folding bar respectively pivotally connected between front and rear ends of the first horizontal bar of the second four-bar linkages of said two side frame units;

a third folding bar connected between the first vertical bars of the second four-bar linkages of said two side frame units on the middle;

a fourth folding bar connected between the second vertical bars of the first four-bar linkages of said two side frame units;

a stretcher connected between said first folding bar and said second folding bar;

a fabric back panel connected between the second vertical bars of the first four-bar linkages of said two side frame units;

a fabric seat panel connected between the first horizontal bars of the first four-bar linkages of said two side frame units; and four wheels respectively provided at front and rear ends of the first horizontal bars of the second four-bar linkages of said two side frame units.

2. The folding wheelchair as claimed in claim 1, further comprising two swivel hooks respectively pivoted on said side frame units and adapted to hook on the pivot pins of said side frame units to further lock the first guide rods and second guide rods of said side frame units to the common second horizontal bar of the first four-bar linkages and second four-bar linkage of each of said two side frame units.

3. The folding wheelchair as claimed in claim 1, further comprising a plurality of T-shaped connecting plates and L-shaped connecting plates to pivotally connect the horizontal bars and vertical bars of said side frame units and said four folding bars and said stretcher to one another with fastening elements.

4. The folding wheelchair as claimed in claim 1, further comprising two grips respectively fixedly fastened to the second vertical bars of the first four-bar linkages of said two side frame units at a top side.

5. The folding wheelchair as claimed in claim 1, further comprising two armrests respectively fastened to the second vertical bars of the first four-bar linkages of said two side frame units and spaced between said grips and the first horizontal bars of the first four-bar linkages of said two side frame units, said armrest each having a rear end terminating in a stop block.

* * * * *